United States Patent
Solf et al.

(10) Patent No.: US 11,313,977 B2
(45) Date of Patent: Apr. 26, 2022

(54) VERSATILE PET DETECTOR

(71) Applicant: KONINKLIJKE PHILIPS N.V., Eindhoven (NL)

(72) Inventors: Torsten Solf, Aachen (DE); Oliver Muelhens, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/975,731

(22) PCT Filed: Mar. 4, 2019

(86) PCT No.: PCT/EP2019/055230
§ 371 (c)(1),
(2) Date: Aug. 26, 2020

(87) PCT Pub. No.: WO2019/170560
PCT Pub. Date: Sep. 12, 2019

(65) Prior Publication Data
US 2020/0408928 A1 Dec. 31, 2020

Related U.S. Application Data

(60) Provisional application No. 62/638,336, filed on Mar. 5, 2018.

(51) Int. Cl.
*G01T 1/164* (2006.01)
*G01T 1/20* (2006.01)

(52) U.S. Cl.
CPC .......... *G01T 1/1644* (2013.01); *G01T 1/2018* (2013.01)

(58) Field of Classification Search
None
See application file for complete search history.

(56) References Cited

U.S. PATENT DOCUMENTS

| | | | |
|---|---|---|---|
| 2004/0227091 A1* | 11/2004 | LeBlanc | G01T 1/1642 250/366 |
| 2005/0111612 A1* | 5/2005 | Ikhlef | A61B 6/5282 378/19 |
| 2011/0240864 A1 | 10/2011 | Degenhardt | |
| 2011/0260864 A1* | 10/2011 | Dearborn | G06F 1/165 340/540 |
| 2013/0009066 A1 | 1/2013 | Grazioso | |
| 2014/0361181 A1* | 12/2014 | Liu | G01T 1/249 250/366 |
| 2015/0355344 A1 | 12/2015 | Xie | |
| 2016/0183893 A1 | 6/2016 | Zhang | |
| 2017/0192107 A1 | 7/2017 | Li | |

FOREIGN PATENT DOCUMENTS

| WO | 2010067220 A2 | 6/2010 |
|---|---|---|
| WO | 2013098699 A2 | 7/2013 |

OTHER PUBLICATIONS

International Search Report and Written Opinion of PCT/EP2019/055230, dated Jun. 6, 2019.

\* cited by examiner

*Primary Examiner* — Edwin C Gunberg

(57) ABSTRACT

A scalable medical imaging detector arrangement is provided having interchangeable sensor tiles with fixed outer dimensions for a fixed or universal mechanical, electrical, and cooling interface. Different sensor tile types with different performance grades and production costs care configured with a common interface for coupling to the medical imaging device, while the rest of the imaging system can remain unchanged.

24 Claims, 14 Drawing Sheets

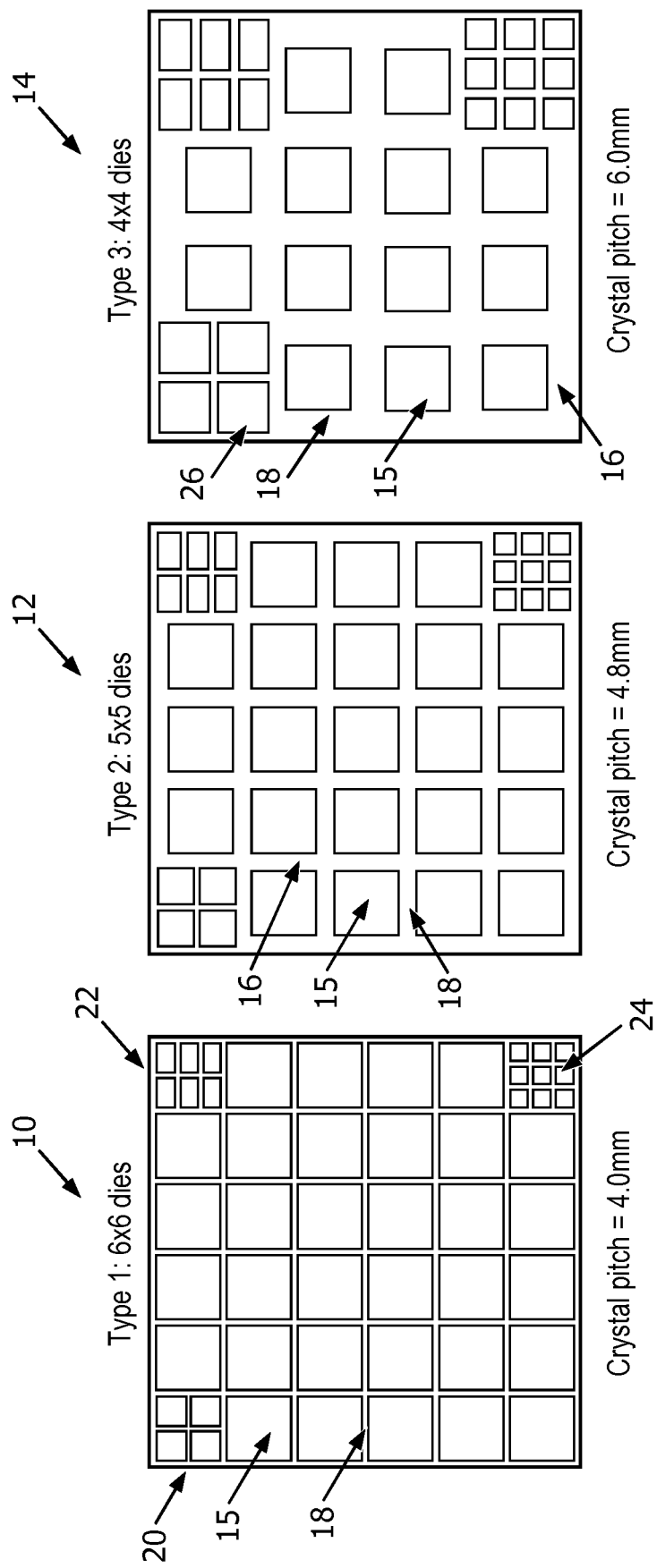

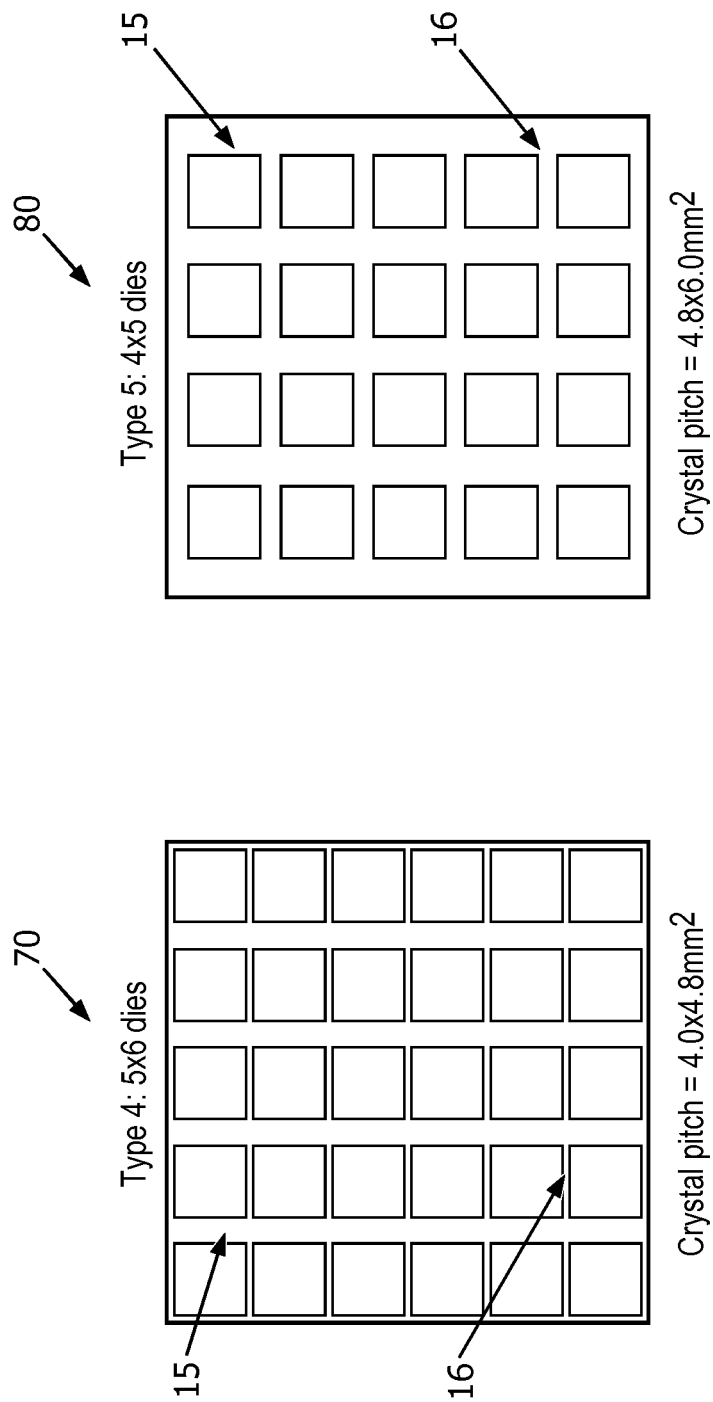

| Scintillator size | 3.86mm | 4.0mm | 4.65mm | 3.86mm |
| Pitch | 4.00mm | 4.10mm | 4.80mm | 6.00mm |
| Name | Tile 4.1 Versa 6x6 | Tile 3.2 Jumbo 5x5 | Tile 4.2 Versa 5x5 | Tile 4.3 Versa 4x4 |
| Readout | Pixelated | Pixelated | Pixelated | Lightguide |
| CRT Trig1 | 220ps | 240ps | 265ps | 380ps |

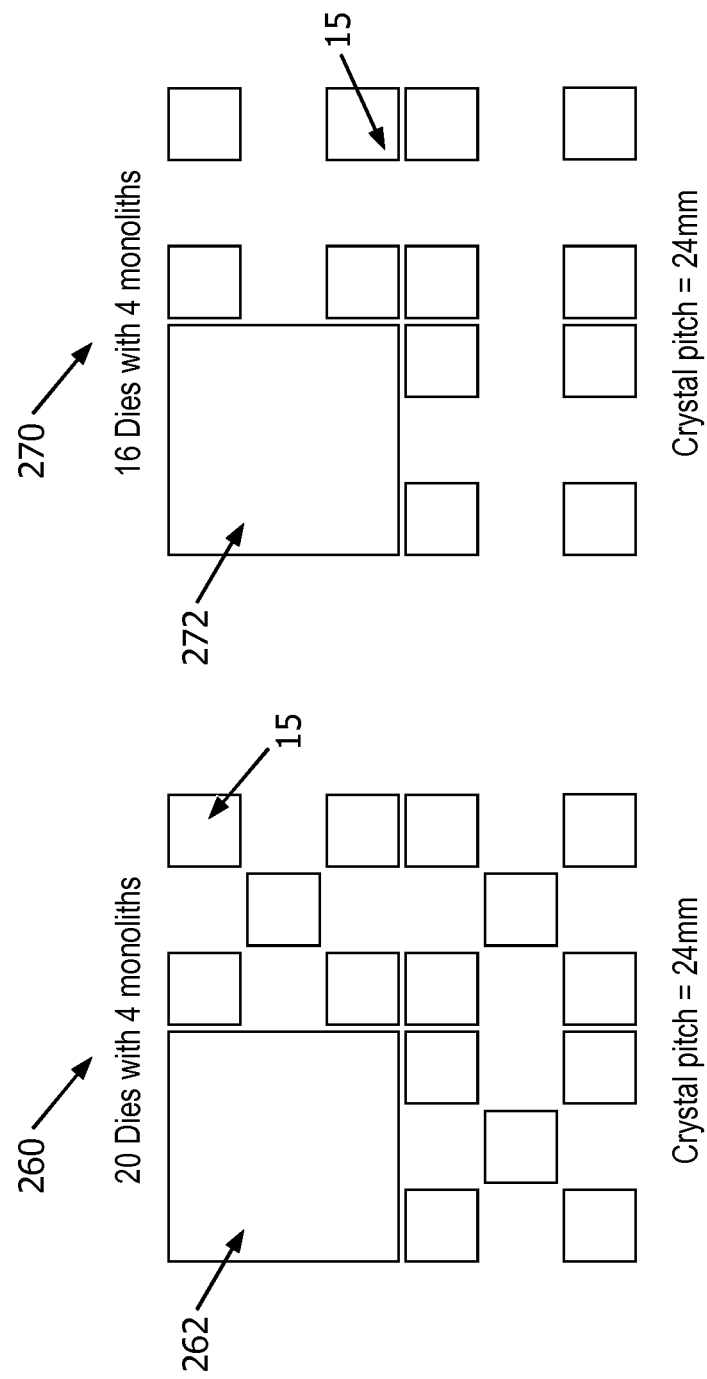

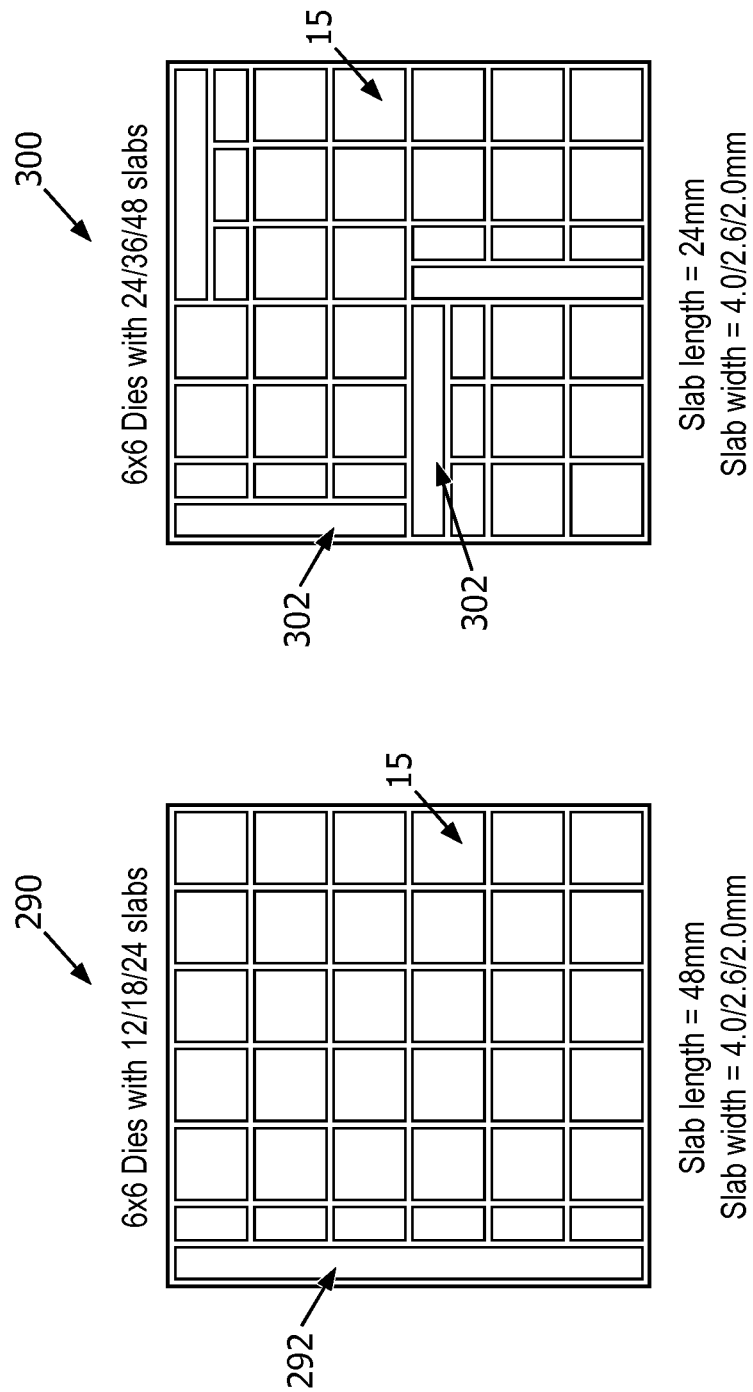

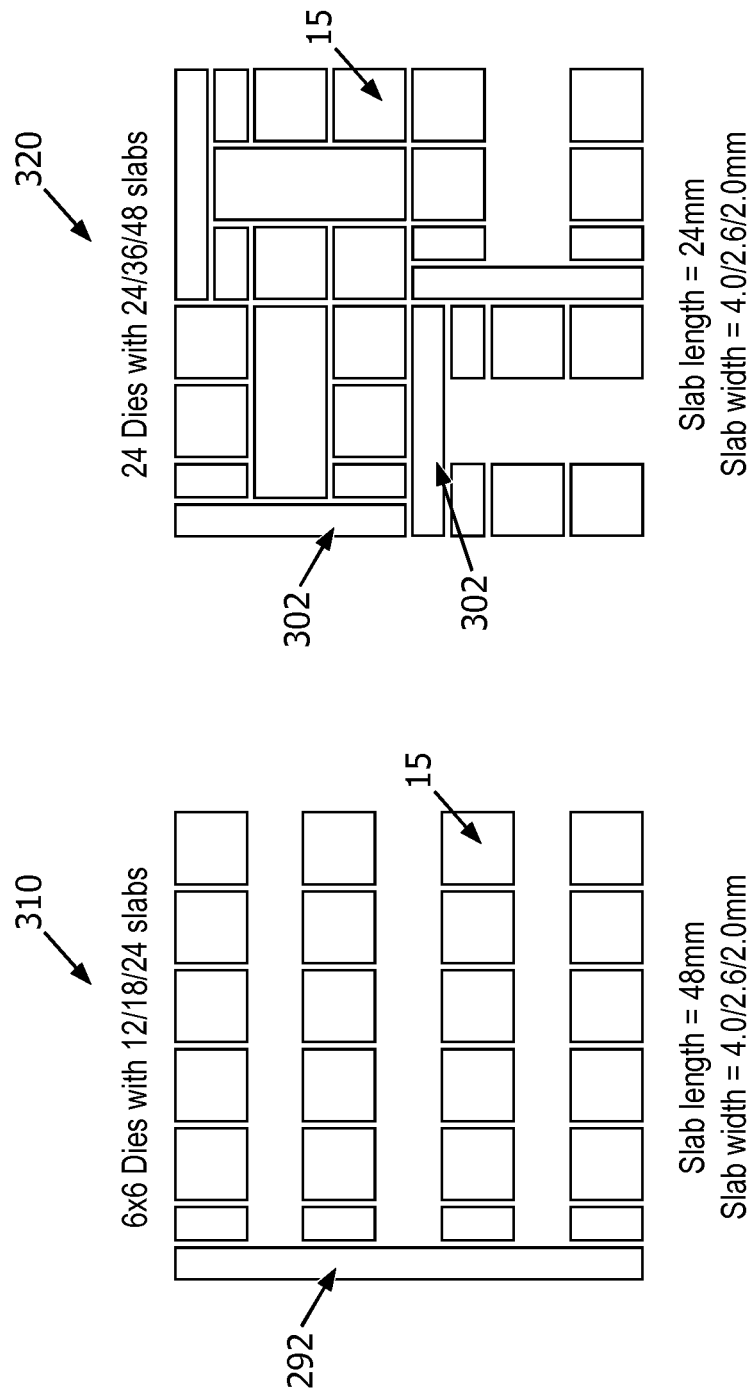

VERSATILE PET DETECTOR

FIELD

The following relates generally to nuclear imaging systems, and more particularly to positron emission tomography (PET) detectors.

BACKGROUND

PET detectors with different requirements on energy, timing, and spatial resolution normally require different PET detectors including different readout boards, control units, gantry and cooling systems, making it nearly impossible to address different market needs with a single PET detector platform.

High-end medical imaging systems like lutetium-yttrium oxyorthosilicate (LYSO)-based time-of-flight (ToF) PET imagers require a maximum fill factor of the silicon photomultiplier (SiPM) sensor to the scintillator face to get optimal coincident timing resolution for ToF-PET.

Low-end medical imaging systems are normally based on non-ToF scintillators like bismuth germanium oxide (BGO) scintillators, where the timing resolution is of less importance and light sharing concepts can be used to reduce the sensor fill factor.

Both concepts often lead to different sensor and electronics configurations, which makes any new development quite expensive.

The following discloses certain improvements.

SUMMARY

In one disclosed aspect, a detector block for a scalable detector in medical imaging system comprises at least one interchangeable sensor tile, at least one interchangeable sensor tile being one of a plurality of interchangeable sensor tile types, each interchangeable sensor tile type having universal outer dimensions. The detector block further comprises a universal mechanical interface configured to couple the interchangeable sensor tile to the scalable detector regardless of the interchangeable sensor tile type. The at least one interchangeable sensor tile comprises an array of sensor dies coupled thereto, each sensor die having a plurality of scintillator crystals coupled thereto.

In another disclosed aspect, an interchangeable sensor tile for use in a detector block in a medical imaging system comprises an array of sensor dies coupled to the interchangeable sensor tile, each sensor die having a plurality of scintillator crystals coupled thereto. The interchangeable sensor tile is one of a plurality of interchangeable sensor tile types, each interchangeable sensor tile type having outer dimensions configured to mate with a universal mechanical interface, and each interchangeable sensor tile type has a different fill factor that correlates to reduced timing resolution and to reduced manufacture cost.

In another disclosed aspect, a nuclear imaging system comprises a plurality of detector blocks, each detector block including a universal mechanical interface, and an interchangeable sensor tile coupled to each respective mechanical interface. Each interchangeable sensor tile comprises an array of sensor dies coupled to the interchangeable sensor tile, each sensor die having a plurality of scintillator crystals coupled thereto. The interchangeable sensor tile is one of a plurality of interchangeable sensor tile types, each interchangeable sensor tile type having outer dimensions configured to mate with a universal mechanical interface. Each interchangeable sensor tile type has a different fill factor that correlates to reduced timing resolution and to reduced manufacture cost.

One advantage resides in reduced manufacturing cost.

Another advantage resides in improved device scalability.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 1 illustrates a sensor tile arrangement having a maximum sensor fill factor for optimal energy, timing and spatial resolution.

FIG. 2 illustrates sensor tile arrangement with a medium-level sensor fill factor for medium performance (energy, timing, and spatial resolution).

FIG. 3 illustrates a sensor tile arrangement having lower-level Value-PET performance with a lowest unit cost of the three illustrated examples.

FIG. 7 illustrates a configuration using a 5×6 sensor die array having a crystal pitch of 4.0×4.8 mm so that the sensor tile has the same outer dimensions as in FIG. 1-6

FIG. 8 illustrates a configuration using a 4×5 sensor die array having a crystal pitch of 6.0×4.8 mm so that the sensor tile has the same outer dimensions as in FIG. 1-7

FIG. 19 illustrates a VersaTile configuration with reduced fill factor of 55%.

FIG. 20 illustrates a VersaTile configuration with a reduced fill factor of 44%.

FIG. 22 illustrates a VersaTile configuration for slab detector arrays with long slabs (e.g., extending the length of an edge of the detector).

FIG. 23 illustrates a VersaTile configuration for slab detector arrays with shorter slabs.

FIG. 24 illustrates a VersaTile configuration for a slab detector as described above with reduced 67% sensor fill factor for low-cost designs.

FIG. 25 illustrates a second VersaTile configuration for a slab detector as described above with reduced 67% sensor fill factor.

DETAILED DESCRIPTION

Figure 4:
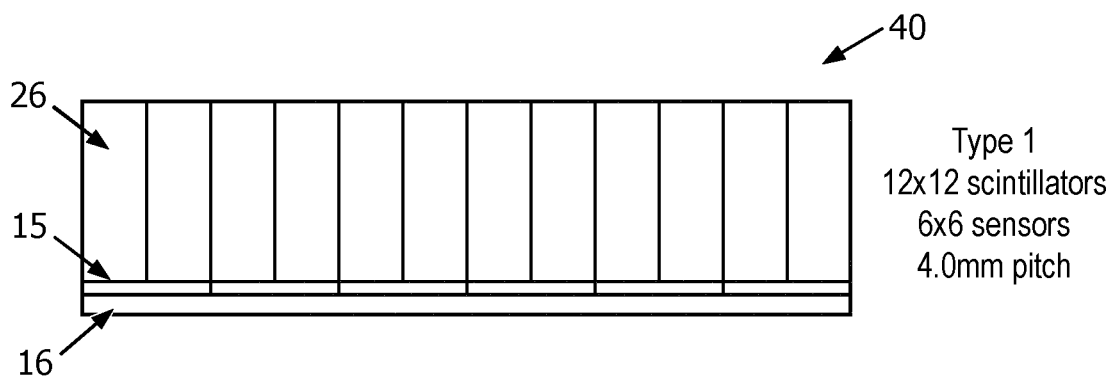
FIG. 4 illustrates a scintillator configuration comprising a 12×12 array of scintillator crystals for use in a 6×6 sensor array.

To overcome the aforementioned problems, a basic building block of a solid state PET detector based on SiPMs can be realized with the herein-described VersaTile SiPM detector in order to re-use the rest of the PET system infrastructure without further modifications. The basic building block of the sensor is based on an integrated silicon die which comprises 2×2 or 4×4 SiPMs for individual energy and timing measurements. The VersaTile detector can be used for PET, PET-computed tomography (CT) and PET-magnetic resonance imaging (MRI) and other combinations as well as single-photon emission computed tomography (SPECT) imaging.

The VersaTile sensor tile is described herein as a building block for a scalable PET detector with fixed outer dimensions for the sensor tiles to use the same readout platform and electromechanical and thermal interfaces. Several grades of sensor fill factor are employed, such as 6×6, 5×5 and 4×4 sensor dies for quadratic scintillator faces, and other combinations such as 6×5 or 5×4 sensor dies for rectangular scintillator faces on a quadratic sensor tile of fixed geometry. In one embodiment, the VersaTile sensor tile has a quadratic size of between, e.g., 48 mm and 54 mm.

A mechanical interface (which may comprise a thermal interface such as a cooling plate or heat sink or the like) can be employed towards the readout and mounted by soldered screw nuts, snap fits, or other suitable fasteners. Liquid glue need not be used to mount the scintillators on the sensor tile, local light guides or the reflector mask. In one embodiment, a dielectric reflector mask which is not sensitive to light is applied over the sensor area. The reflector mask can be mounted to the scintillators with optical clear adhesive (OCA, a non-liquid glue), an air gap above the non-sensitive part of the sensor is maintained. Gaps between and under the sensors can be filled with an under-fill after mounting the scintillator array.

In another embodiment, the sensor PCB side face and the mechanical interface, which may comprise a heat sink or cooling plate, are covered with one or several dielectric reflectors, which also cover the scintillator side faces around the sensor tile for mechanical stiffness as well as for improved light collection efficiency. The scintillators need only be mounted at the top and bottom crystal faces. The top face of the scintillator array can be covered with two or more dielectric reflectors to increase the light collection efficiency. Additionally, the scintillators can be separated between the sensor dies with dielectric reflectors (e.g. Vikuiti [Enhanced Specular Reflector from 3M]) to form light-tight pockets.

A one-to-one coupling of 2×2 scintillators on a sensor die can be employed with 2×2 SiPM sensors as well as light sharing concepts for sensor dies with more pixels (e.g. 2×3 3×3, or 4×4, etc.) Scintillators which are ⅔ of the sensor pitch, ⅘ or 3/2 of the sensor pixel pitch can also be employed.

Local glass light guides can be used with the scintillator arrays for high resolution designs where 9 scintillators are read out by one sensor die with a die pitch given by the maximum achievable sensor packing fraction (e.g. 8 mm die pitch or the like). Local glass light guides can also be used where 9 scintillators are read out by one sensor die with a relaxed packing fraction (e.g. 12 mm die pitch)

In another embodiment, multiple monolithic scintillators can be read out with maximum sensor fill factor (e.g. 2×2 or 3×3 blocks) or with a reduced sensor fill factor (e.g. 2×2 or 3×3 blocks) with sensor positioned in the corners of the scintillator (e.g. 4 or 5 sensors per monolith). Additionally or alternatively, scintillator slabs which fit the pixel pitch of the sensor or ½, ⅓, or ¼ of the sensor die pitch to realize 4 mm, 2.6 mm, or 2.0 mm spacing can be read out. The scintillator slabs can be employed over the complete vertical or horizontal extension of the sensor tile or ½ of the sensor tile. In another embodiment, mixed vertical and horizontal slabs are employed within one sensor tile. Wherein the slabs have a width of ½ of the sensor tile width. A reduced sensor fill factor can also be used for scintillator slab readout, with the sensor die positioned at the ends of the scintillator slabs.

The described VersaTile concept allows a sensor tile design with variable PET performance and cost structure while maintaining the outer dimensions, as well as electromechanical and thermal interfaces constant. The VersaTile concept is based on sensor units ("tiles") with a variable number of silicon dies, realizing different performance grades: Maximum sensor packing fraction for ultimate ToF performance; Medium packing fraction for moderate ToF performance; Low sensor packing fraction for low-end or non-ToF applications; etc. Pixelated readout with one-to-one coupling as well as light sharing concepts with local light guides for each sensor die are also disclosed.

In the following example, it is assumed that each sensor die can read out four scintillator pixels of equal size with a direct one-to-one coupling. However, the herein-described examples are not limited by this assumption, as will be appreciated by those of skill in the art.

FIGS. 1-3 illustrate examples of a VersaTile concept with three performance grades. In FIG. 1, a sensor tile arrangement 10 having a maximum sensor fill factor is used for optimal energy, timing and spatial resolution. FIG. 2 shows a sensor tile arrangement 12 with a medium-level sensor fill factor for medium performance (energy, timing, and spatial resolution). FIG. 3 shows a sensor tile arrangement 14 having lower-level Value-PET performance with the lowest bill of materials (BOM) or unit cost of the three illustrated examples. The tile geometry is indicated by sensor dies 15, each comprising a scintillator crystal array on a sensor tile 16. The visible area of the sensor tile 16 is free of silicon. For light-tight encapsulation, this area is covered by a dielectric reflector film (not shown). Each of FIGS. 1-3 shows several scintillator matrix configurations: for example a one-to-one coupled crystal array configuration 20 as indicated in the top left corners, a configuration 22 with rectangular scintillators 2×3 per sensor die pitch in the top right corner, and a high resolution configuration 24 with 3×3 scintillators in the bottom right. It will be understood that although multiple scintillator crystal array configurations are illustrated in each sensor tile in FIGS. 1-3 for exemplary purposes, a single crystal array configuration common to each sensor die in the sensor tile can be employed in accordance with one embodiment. Scintillator crystals 26 are also shown.

Figure 5:
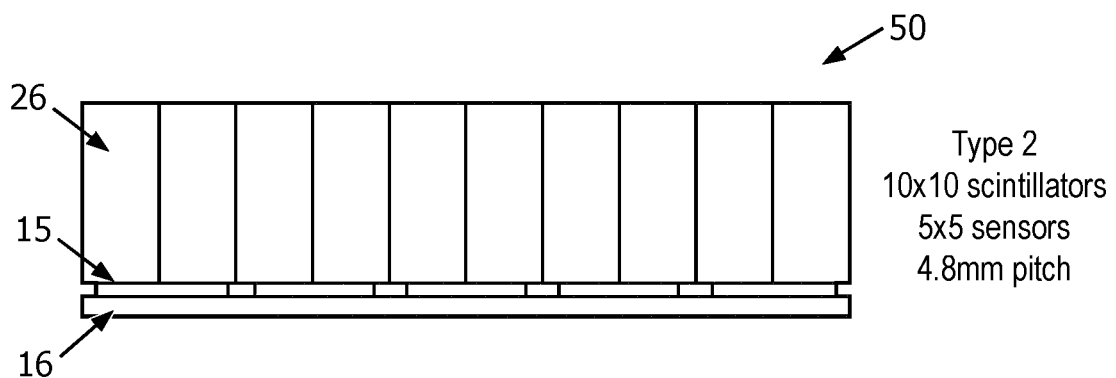
FIG. 5 illustrates a scintillator configuration comprising a 10×10 array of scintillator crystals for use in a 5×5 sensor array.
Figure 6:
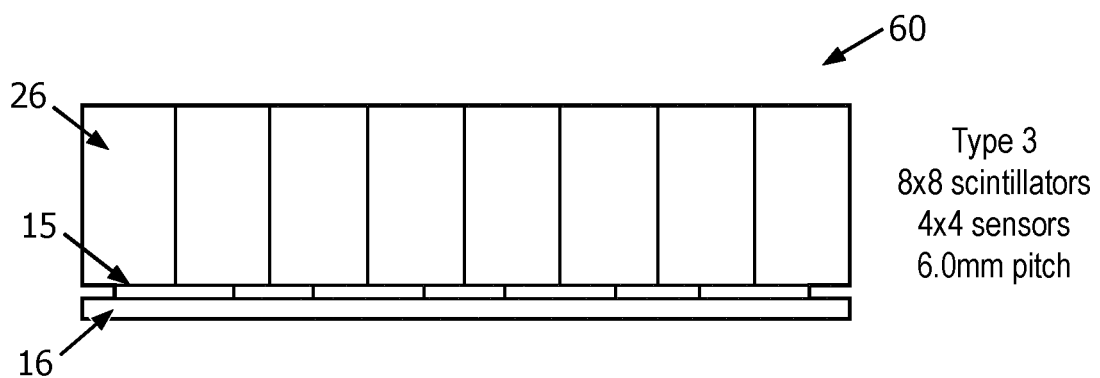
FIG. 6 illustrates a scintillator configuration comprising an 8×8 array of scintillator crystals for use in a 4×4 sensor array.

FIGS. 4-6 show side views of the above proposed VersaTile concepts with three performance grade examples, showing scintillator crystals 26 in an array, the sensor dies 15, and the sensor tile 16. The reflectors are not shown in FIGS. 4-6, which encapsulate four scintillators in this example. FIG. 4 shows a scintillator configuration 40 comprising a 12×12 array of scintillator crystals 26 for use in a 6×6 sensor array wherein each sensor die has a pitch of 4.0 mm while maintaining the outer dimension.

FIG. 5 shows a scintillator configuration 50 comprising a 10×10 array of scintillator crystals 26 for use in a 5×5 sensor array wherein each sensor die has a pitch of 4.8 mm, giving the sensor array while maintaining the outer dimension.

FIG. 6 shows a scintillator configuration 60 comprising an 8×8 array of scintillator crystals 26 for use in a 4×4 sensor array wherein each sensor die has a pitch of 6.0 mm, giving the sensor array while maintaining the outer dimension.

In one embodiment, the packing fraction of the scintillator is in all cases maximized. An advantage in the BOM is the use of different scintillators (e.g., LYSO, LuGAGG, lutetium oxyorthosilicate (LSO) an gadolinium oxyorthosilicate (GSO), and BGO, any of which may be used in accordance with the various embodiments described herein) with different scintillator pitches (e.g., 4.0 mm 4.8 mm and 6.0 mm) without changing the sensor tile or readout infrastructure. According to one example, the silicon fill factor scales with 100% for type 1, 70% for type 2, and 44% for type 3, which is the dominant cost factor. Due to fixed costs per sensor tile associated with, e.g., PCB mounting, testing and due to yield considerations, etc., the reduction is even over-proportional to the silicon fill factor.

The dead areas of the sensor tile are covered by highly reflective dielectric mirrors to create a light tight encapsulation for the scintillators. This reduces the light loss of the setup efficiently. In general, the VersaTile concept also allows designs with different numbers of dies in x and y directions, as shown in FIGS. 7 and 8.

FIGS. 7 and 8 illustrate examples of the VersaTile concept with different pitches in x and y direction to allow pixelated readout for rectangular pixels. This concept allows cost efficient designs where the resolution in the axial field of view is different than in the x-y plane of the PET scanner. FIG. 7 shows a configuration 70 using a 5×6 sensor die array 15 having a crystal pitch of 4.0×4.8 mm so that the dimension is around 48 mm on a side on a sensor tile 16. FIG. 8 shows a configuration 80 using a 4×5 sensor die array 15 having a crystal pitch of 6.0×4.8 mm while maintaining the outer dimension. The sensor dies 15 are arranged on the sensor tile 16.

With regard to BGO scintillators, one aspect of the claimed innovation involves the use of a matching reflector mask to reduce the degradation in energy resolution for lower silicon fill factor. The dead area of the sensor tile is covered by a highly reflective dielectric mirror to minimize the light loss due to lower silicon fill factor efficiently.

Figure 9:
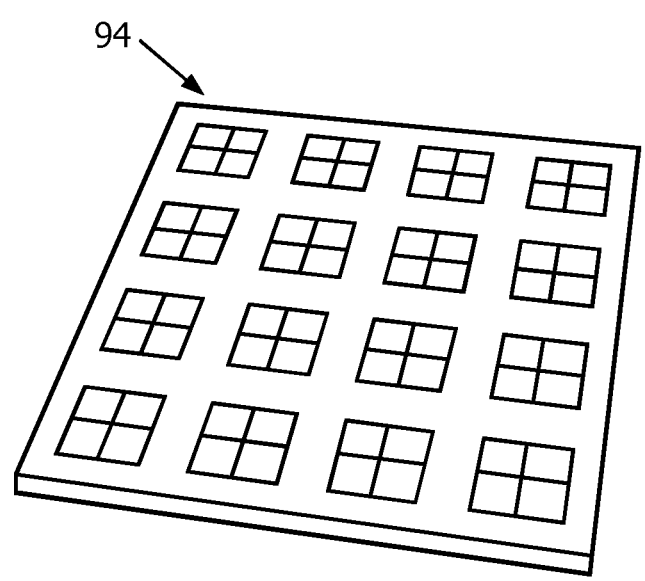
FIG. 9 illustrates an example of the highly reflective mask in detail.

FIG. 9 shows an example of the highly reflective mask 94 for investigation of light loss for smaller silicon fill factor in detail.

LYSO scintillators can also be used in conjunction with the herein-described concepts. A reduced silicon fill factor has a strong influence on the achievable time-of-flight (ToF) accuracy. Measurements and simulations show that for equal scintillator length, the timing degrades with 1/sqrt(fill_factor). The VersaTile concept allows different designs to find optimal compromise between cost and timing performance.

For larger scintillators, the net image resolution degrades. To combat this degradation, a non-pixelated readout can be employed to keep the spatial resolution high.

Figure 10:
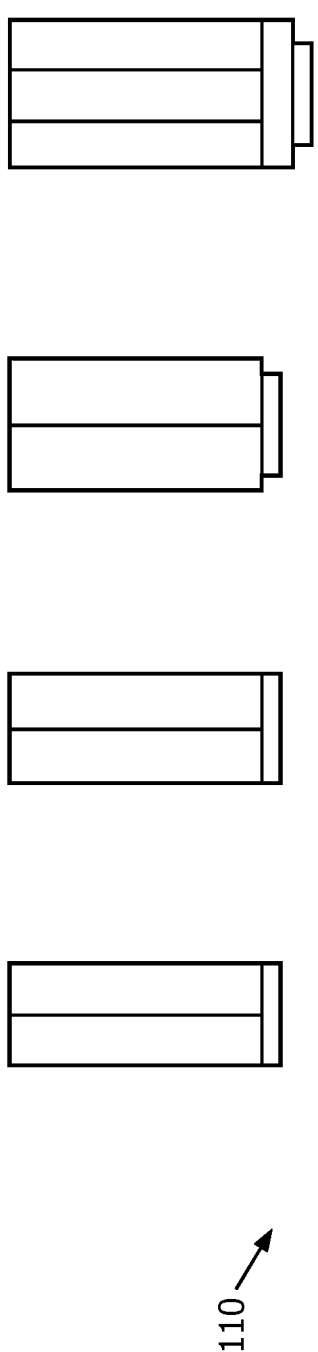
FIG. 10 illustrates a table correlating various scintillator crystal parameters (pitch, readout type, etc.) for LYSO scintillators of different sizes.

FIG. 10 shows a table 110 correlating various scintillator crystal parameters (pitch, readout type, etc.) for LYSO scintillators of different sizes. The intrinsic building blocks are encapsulated in dielectric reflector grids to form scintillator arrays.

Figure 12:
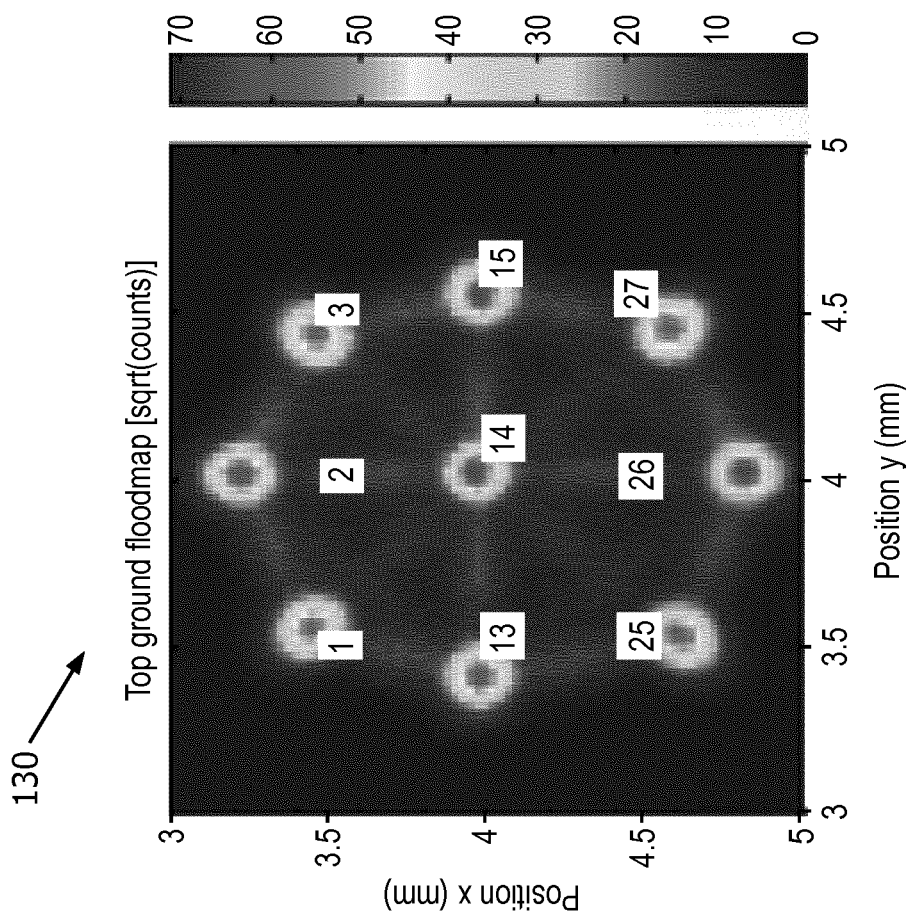
FIG. 12 illustrates a corresponding floodmap which shows a clear separation of all scintillators.
Figure 11:
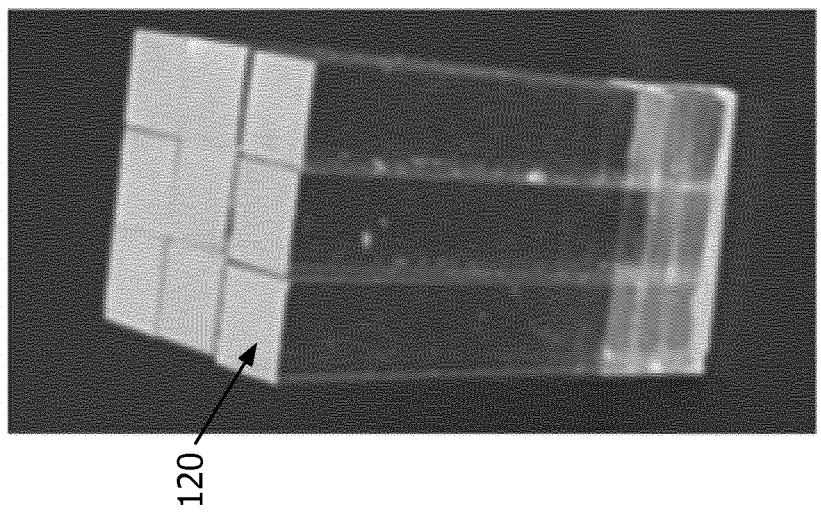
FIG. 11 illustrates the VersaTile concept for LYSO scintillators using a local light guide for each sensor die to read out 9 scintillators with one sensor die.

The VersaTile light sharing concept for LYSO and BGO scintillators is shown in FIGS. 11 and 12. FIG. 11 shows the VersaTile concept for LYSO scintillators 120 using a local light guide (not shown) for each sensor die to read out 9 scintillators with one sensor die. FIG. 12 shows a corresponding floodmap 130 which shows a clear separation of all scintillators. The same concept also works with BGO scintillators with a reduced floodmap resolution (due to the lower light yield).

In one embodiment, scintillators with top face grinding are used. For LYSO crystals, this approach increases the light yield by 35%-40%, and for BGO crystals, approximately 60%-70%. This approach also allows for light sharing concepts for LYSO with an effective energy resolution better than 10.5% while using less than 50% of the sensor area.

With regard to the mounting and fabrication of the scintillator building blocks, in one embodiment, optical clear adhesive can be used to mount the scintillators on the glass plates without any glue spillage to maintain air pockets on all side faces of the scintillators. Vikuiti dielectric mirror film can be used between the dies.

When using high resolution LYSO scintillators, local light sharing can also be employed to read out scintillators with a smaller pitch than the sensor pixel. The example in FIG. 11 shows 9 scintillators per die with a scintillator size of 2.6 mm using a local light guide per die with 8 mm pitch. The package of 9 scintillators is separated by dielectric reflectors to the next die.

Figure 13:
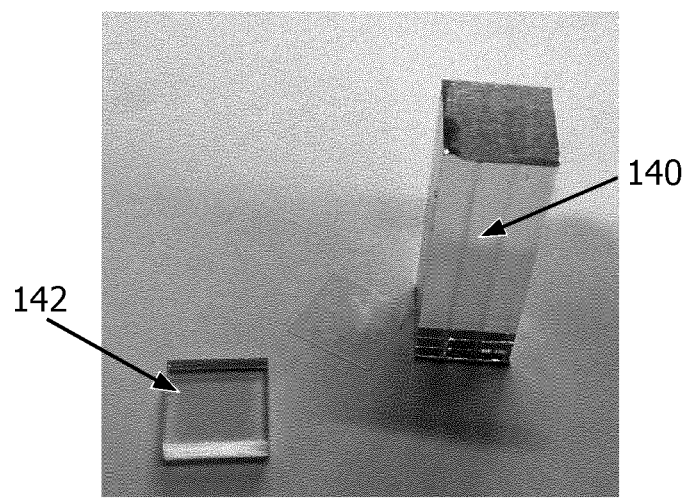
FIG. 13 shows a high resolution scanner with 9 scintillators (with local light guides as basic building block.
Figure 14:
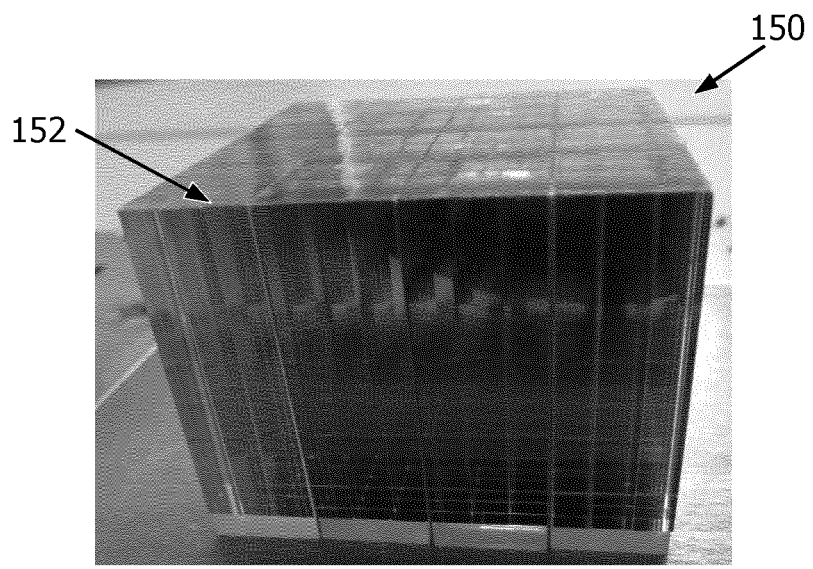
FIG. 14 shows an array of 9-scintillator dies after assembly as scintillator array.

FIG. 13 shows a high resolution scanner with 9 scintillators 140 (e.g., 2.6 mm×2.6 mm×22 mm, or some other suitable size) with local light guides 142 as basic building block. FIG. 14 shows an array 150 of 9-scintillator dies 152 after assembly as scintillator array.

Figure 15:
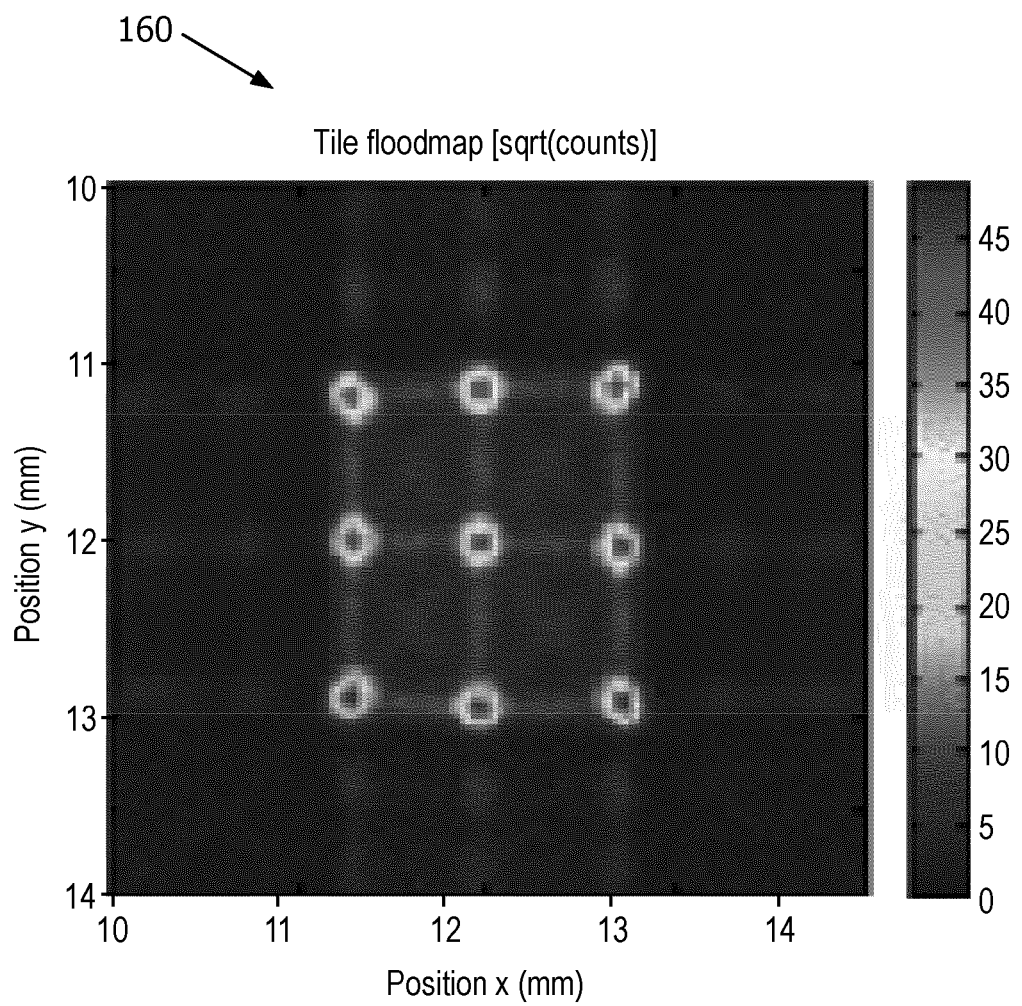
FIG. 15 illustrates a floodmap with 9 scintillators per die with scintillator pitch to be ⅓ of the die pitch having dimensions of 2.6 mm×2.6 mm×22 mm.

FIG. 15 shows a floodmap 160 with 9 scintillators per die with scintillator pitch that is ⅓ of the die pitch having dimensions of 2.6 mm×2.6 mm×22 mm.

Figure 16:
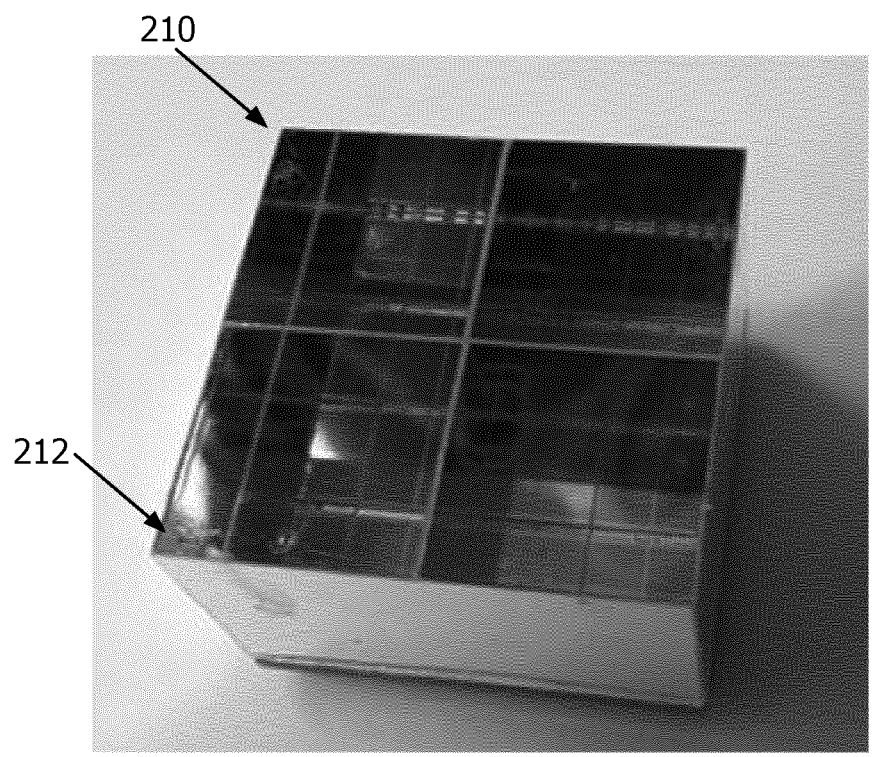
FIG. 16 illustrates an example of a sensor stack with four monolithic LYSO scintillator blocks.

FIG. 16 shows an example of a sensor stack 210 with four monolithic LYSO scintillator blocks 212.

Figure 18:
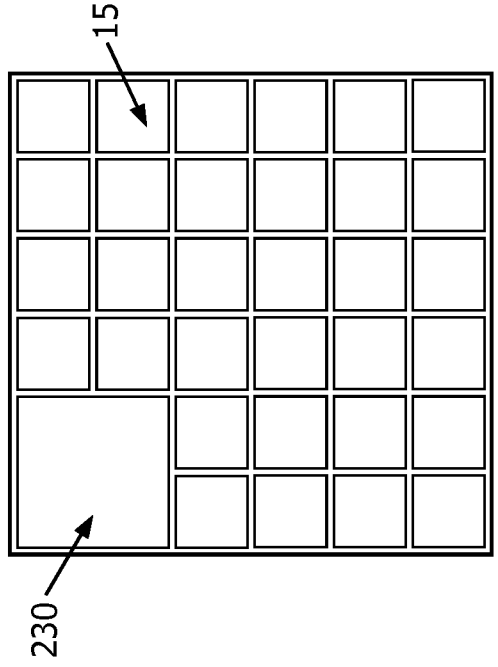
FIG. 18 illustrates a VersaTile configuration with maximum fill factor and a monolithic scintillator covering a 2×2 block of sensor dies.
Figure 17:
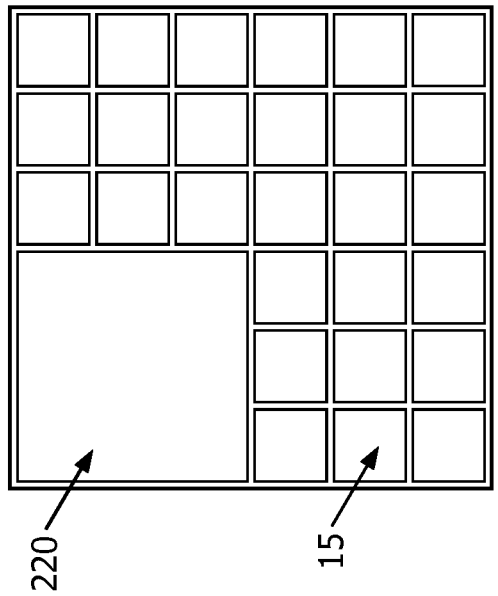
FIG. 17 illustrates a VersaTile configuration with maximum fill factor and a monolithic scintillator covering a 3×3 block of sensor dies.

FIGS. 17 and 18 show VersaTile configurations with maximum fill factor (i.e., minimal or no spacing between dies 15 to read out two different monolithic scintillators sizes: either 3×3 blocks 220 (FIG. 17) or 2×2 blocks 230 (FIG. 18). The smaller block 230 of 16 mm×16 mm×19 mm LYSO shows good energy and timing performance at comparable scintillator price.

The right example shows good time-of-flight performance on LYSO blocks of 230 ps on Trig 1 on 16×16×19 mm LYSO cubes with 10.0% energy resolution. In addition to the mentioned high performance detector designs, a low cost version can be created based on the VersaTile concept by exploiting the freedom of sensor die placement. For monolithic readout the edges and corners are used for good event positioning, but other areas can be left out. This allows sensor designs with 55% or 44% sensor fill factor while maintaining good spatial resolution below 2-3 mm.

FIG. 19 shows a VersaTile configuration 260 with reduced fill factor of 55%. The dies 15 are shown in a checkerboard arrangement so that each monolithic scintillator 262 has a sensor die under its center and at each corner. Spaces between sensor dies are not occupied.

FIG. 20 shows a VersaTile configuration 270 with a reduced fill factor of 44%. The dies 15 are shown in a corners-only arrangement so that each monolithic scintillator 272 has a sensor die under each corner. Spaces between sensor dies are not occupied. These (and other) reduced fill factor VersaTile configurations can be used for monolithic scintillators readout, e.g., for a low cost BGO detector for high resolution non-ToF applications.

Figure 21:
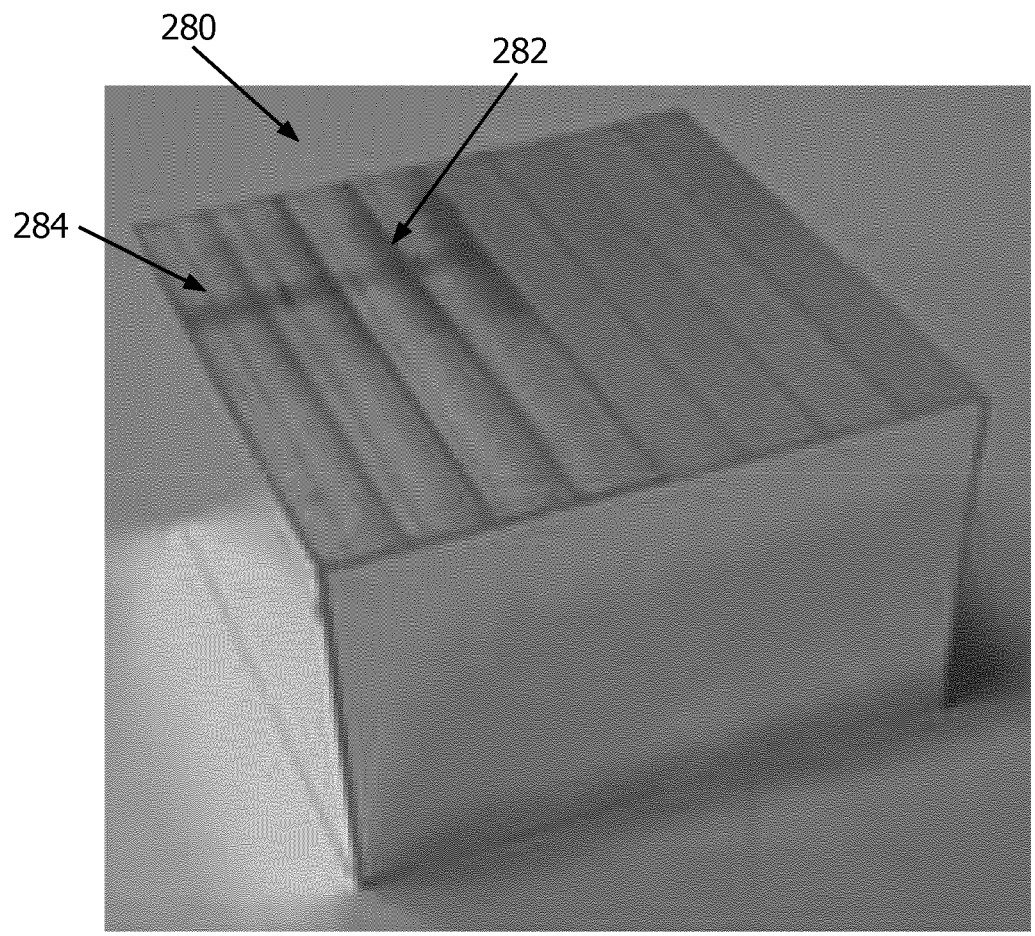
FIG. 21 illustrates an example of an LYSO slab detector array.

VersaTile configuration can also be optimized for scintillator slabs. That is, the sensor concept allows stacks with detector slabs for PET imaging. FIG. 21 shows an example of a LYSO slab detector array 280 with dielectric mirrors 282 between every slab 284, polished or with top face grinding to increase light yield. This feature provides a compromise between pixelated and monolithic scintillator readout. Here, the calibration procedure can be simplified and realized on system level because coincident events can be collimated by vertical and horizontal slabs automatically. Measurements with slabs have shown timing resolutions of 230 ps in Trig 1 and energy resolution of 11.5% (on 32 mm long slabs).

FIG. 22 shows a VersaTile configuration 290 for slab detector arrays with long slabs 292 (e.g., extending the length of an edge of the detector). Dies 15 are also shown. FIG. 23 shows a VersaTile configuration for slab detector arrays with shorter slabs 302 (e.g., spanning less than the width of the detector). In one embodiment, the slabs have a width to match the sensor pixel pitch (e.g., 4 mm or some other width). In another embodiment, the slabs can be ⅓ of the sensor die pitch (e.g., 2.6 mm) or ¼ of the sensor die pitch (e.g., 2 mm). The combination of vertical and horizontal slabs can simplify the auto calibration routine on a system level because events are always collimated on one dimension already if the coincident event is detected by a slab in the perpendicular direction.

The examples of FIGS. 22 and 23 show two different VersaTile designs for optimal performance. Depending on the scintillator manufacturing process, the slab detector can be cheaper than the pixelated or monolithic approach for equal sensitivity while increasing the PET performance. The spatial resolution is dominated by the slab width (e.g., 2.0 mm, 2.6 mm, 4.0 mm, etc.) in one direction.

FIG. 24 shows a VersaTile configuration 310 for a slab detector as described above with reduced 67% sensor fill factor for low cost designs. Dies 15 are also shown.

FIG. 25 shows a VersaTile configuration 320 for a slab detector as described above with reduced 67% sensor fill factor for low cost designs and having a different sensor die orientation than that shown in FIG. 24. Dies 15 are also shown.

The above described sparse VersaTile sensor configurations facilitate providing low cost PET systems with an emphasis on high spatial resolution by compromising ToF resolution.

The invention has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A detector block for a scalable detector in a medical imaging system, comprising:
   at least one interchangeable sensor tile, the at least one interchangeable sensor tile being one of a plurality of interchangeable sensor tile types, each interchangeable sensor tile type having universal outer dimensions, wherein each sensor tile type has a different fill factor, and a reduced fill factor correlates to a reduced timing resolution and a reduced manufacturing cost; and
   a universal mechanical interface configured to couple the interchangeable sensor tile to the scalable detector regardless of the interchangeable sensor tile type, wherein the at least one interchangeable sensor tile comprises an array of sensor dies coupled thereto, each sensor die having a plurality of scintillator crystals coupled thereto.

2. The detector block according to claim 1, wherein the array of sensor dies comprises one of a 4×4 array, a 4×5 array, a 5×5 array, a 5×6 array, and a 6×6 array.

3. The detector block according to claim 1, wherein each plurality of scintillator crystals is arranged in one of a 2×2 array and a 3×3 array.

4. The detector block according to claim 1, wherein the mechanical interface comprises a cooling plate or heat sink coupled to the sensor tile by one or more mechanical fasteners.

5. The detector block according to claim 4, wherein the one or more mechanical fasteners are at least one of soldered screw nuts and snap fits.

6. The detector block according to claim 1, wherein the interchangeable sensor tile further comprises a dielectric reflector mask on a sensor side of the interchangeable sensor tile, wherein the dielectric reflector mask covers areas of the sensor tile not populated with scintillation crystals.

7. The detector block according to claim 1, wherein the different fill factor results in less than all of the sensor tile's being populated with sensor dies.

8. The detector block according to claim 7, wherein the plurality of scintillator crystals includes a plurality of monolith crystals, each positioned over at least 4 respective sensor dies.

9. The detector block according to claim 7, wherein in the plurality of scintillator crystals includes a plurality of slab scintillator crystals that each span more than one sensor die.

10. The detector block according to claim 9, wherein the slab scintillator crystals have a width that is less than a pitch of the sensor dies on the interchangeable sensor tile.

11. The detector block according to claim 1, wherein plurality of scintillator crystals are one of bismuth germanium oxide (BGO), lutetium-yttrium oxyorthosilicate (LYSO) crystals, lutetium oxyorthosilicate (LSO) an gadolinium oxyorthosilicate (GSO).

12. The detector block according to claim 1, wherein the medical imaging system is one of a positron emission tomography (PET) imaging system, a PET-computed tomography (CT) imaging system, a PET-magnetic resonance (MR) imaging system, and a single-photon emission computed tomography (SPECT) imaging system.

13. The detector block according to claim 1, wherein the mechanical interface comprises a thermal interface.

14. An interchangeable sensor tile for use in a detector block in a medical imaging system, comprising:
   an array of sensor dies coupled to the interchangeable sensor tile, each sensor die having a plurality of scintillator crystals coupled thereto;
   wherein the interchangeable sensor tile is one of a plurality of interchangeable sensor tile types, each interchangeable sensor tile type having outer dimensions configured to mate with a universal mechanical interface; and wherein each interchangeable sensor tile type has a different fill factor that correlates to reduced timing resolution and to reduced manufacture cost.

15. The interchangeable sensor tile according to claim 14, wherein the array of sensor dies comprises one of a 4×4 array, a 4×5 array, a 5×5 array, a 5×6 array, and a 6×6 array.

16. The interchangeable sensor tile according to claim 14, wherein each plurality of scintillator crystals is arranged in one of a 2×2 array and a 3×3 array.

17. The interchangeable sensor tile according to claim 14, further comprising a dielectric reflector mask on a sensor side of the interchangeable sensor tile, wherein the dielectric reflector mask covers areas of the sensor tile not populated with scintillation crystals.

18. The interchangeable sensor tile according to claim 14, wherein the interchangeable sensor tile further comprises a reduced fill factor, such that less than all of the interchangeable sensor tile is populated with sensor dies.

19. The interchangeable sensor tile according to claim 18, wherein the plurality of scintillator crystals includes a plurality of monolith crystals, each positioned over at least 4 respective sensor dies.

20. The interchangeable sensor tile according to claim 18, wherein in the plurality of scintillator crystals includes a plurality of slab scintillator crystals that each span more than one sensor die.

21. The interchangeable sensor tile according to claim 20, wherein the slab scintillator crystals have a width that is less than a pitch of the sensor dies on the interchangeable sensor tile.

22. The interchangeable sensor tile according to claim 14, wherein plurality of scintillator crystals are one of bismuth germanium oxide (BGO), lutetium-yttrium oxyorthosilicate (LYSO) crystals, lutetium oxyorthosilicate (LSO), and gadolinium oxyorthosilicate (GSO).

23. The interchangeable sensor tile according to claim 14, wherein the medical imaging system is one of a positron emission tomography (PET) imaging system, a PET-computed tomography (CT) imaging system, a PET-magnetic resonance (MR) imaging system, and a single photon emission computed tomography (SPECT) imaging system.

24. A nuclear imaging system comprising:
a plurality of detector blocks, each detector block including a universal mechanical interface;
an interchangeable sensor tile coupled to each respective mechanical interface, wherein each interchangeable sensor tile comprises:
an array of sensor dies coupled to the interchangeable sensor tile, each sensor die having a plurality of scintillator crystals coupled thereto;
wherein the interchangeable sensor tile is one of a plurality of interchangeable sensor tile types, each interchangeable sensor tile type having outer dimensions configured to mate with a universal mechanical interface; and
wherein each interchangeable sensor tile type has a different fill factor that correlates to declined timing resolution and to reduced manufacture cost.

* * * * *